US008819464B2

(12) United States Patent
Arai

(10) Patent No.: US 8,819,464 B2
(45) Date of Patent: Aug. 26, 2014

(54) ELECTRONIC APPARATUS AND SYSTEM FOR PLACING PLURALITY OF DEVICES INTO CORRESPONDING POWER SAVE MODES ACCORDING TO PRIORITY LEVEL

(75) Inventor: Taiki Arai, Tokyo (JP)

(73) Assignee: Oki Data Corporation, Tokyo (JP)

( * ) Notice: Subject to any disclaimer, the term of this patent is extended or adjusted under 35 U.S.C. 154(b) by 355 days.

(21) Appl. No.: 13/117,985

(22) Filed: May 27, 2011

(65) Prior Publication Data

US 2011/0296220 A1    Dec. 1, 2011

(30) Foreign Application Priority Data

May 28, 2010    (JP) ................................. 2010-122881

(51) Int. Cl.
*G06F 1/32*    (2006.01)
*G06F 1/26*    (2006.01)
*G03G 15/00*    (2006.01)

(52) U.S. Cl.
CPC .......... *G06F 1/3203* (2013.01); *G03G 15/5004* (2013.01); *Y02B 60/1217* (2013.01); *Y02B 60/1282* (2013.01); *Y02B 60/1278* (2013.01); *Y02B 60/32* (2013.01); *Y02B 60/1267* (2013.01); *G06F 1/3287* (2013.01)
USPC ............................. 713/323; 713/324; 713/340

(58) Field of Classification Search
CPC ............ G06F 1/3203; G06F 1/26; G06F 1/30
USPC .......................................... 713/323, 324, 340
See application file for complete search history.

(56) References Cited

U.S. PATENT DOCUMENTS

| 5,648,799 | A | * | 7/1997 | Kikinis | 345/212 |
|---|---|---|---|---|---|
| 8,117,617 | B2 | * | 2/2012 | Fernstrom et al. | 718/102 |
| 2002/0171867 | A1 | * | 11/2002 | Nobuhara et al. | 358/1.15 |
| 2003/0191975 | A1 | * | 10/2003 | Kohara | 713/300 |
| 2004/0073824 | A1 | * | 4/2004 | Machida | 713/323 |
| 2004/0139385 | A1 | * | 7/2004 | Sakaue | 715/500 |
| 2007/0206211 | A1 | * | 9/2007 | Okutsu et al. | 358/1.14 |
| 2009/0235098 | A1 | * | 9/2009 | Matsunaga | 713/320 |
| 2009/0254908 | A1 | * | 10/2009 | Klave et al. | 718/102 |
| 2010/0014114 | A1 | * | 1/2010 | Oosawa | 358/1.15 |
| 2010/0169685 | A1 | * | 7/2010 | Gough et al. | 713/323 |
| 2010/0322661 | A1 | * | 12/2010 | Yamamichi | 399/75 |
| 2011/0154080 | A1 | * | 6/2011 | Wang et al. | 713/323 |

FOREIGN PATENT DOCUMENTS

| JP | 2000-056869 A | 2/2000 |
|---|---|---|
| JP | 2003-307980 A | 10/2003 |
| JP | 2004-054267 A | 2/2004 |
| JP | 2006-171297 A | 6/2006 |
| JP | 2009-225139 A | 10/2009 |

* cited by examiner

*Primary Examiner* — Thomas Lee
*Assistant Examiner* — Phil Nguyen
(74) *Attorney, Agent, or Firm* — Rabin & Berdo, P.C.

(57) ABSTRACT

An electronic apparatus includes a plurality of devices configured to operate in a power save mode. A detecting section is configured to detect execution of the function of a device and identify a number of executions of each device. An obtaining section is configured to obtain a frequency of use or usage history of the device based on the number of executions. A priority determining section is configured to determine a priority level of the device in being powered on normally, the priority level being determined in accordance with the frequency of use of the device. A power save mode selecting section holds a plurality of power save modes and configured to select a power save mode from among the plurality of power save modes in accordance with the priority level. A controller is configured to control the plurality of devices based on the selected power save mode.

22 Claims, 18 Drawing Sheets

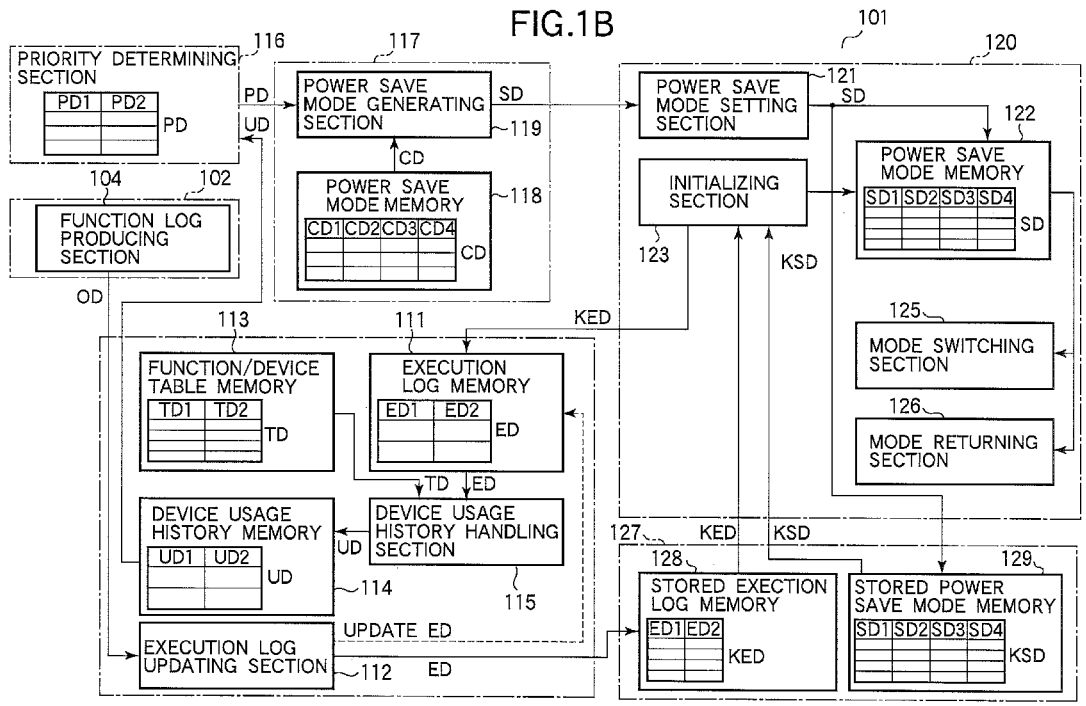

| DEVICE NAME | POWER SAVE CONDITION | WARM-UP CONDITION | POWER SAVE LEVEL |
|---|---|---|---|
| SCANNER | 15 Min. | HIGH | NORMAL |
| FACSIMILE | 10 Min. | LOW | POWER SAVE |
| COMMUNICATOR | 5 Min. | LOW | DEEP SLEEP |
| PRINTER | 1 Min. | LOW | DEEP SLEEP |

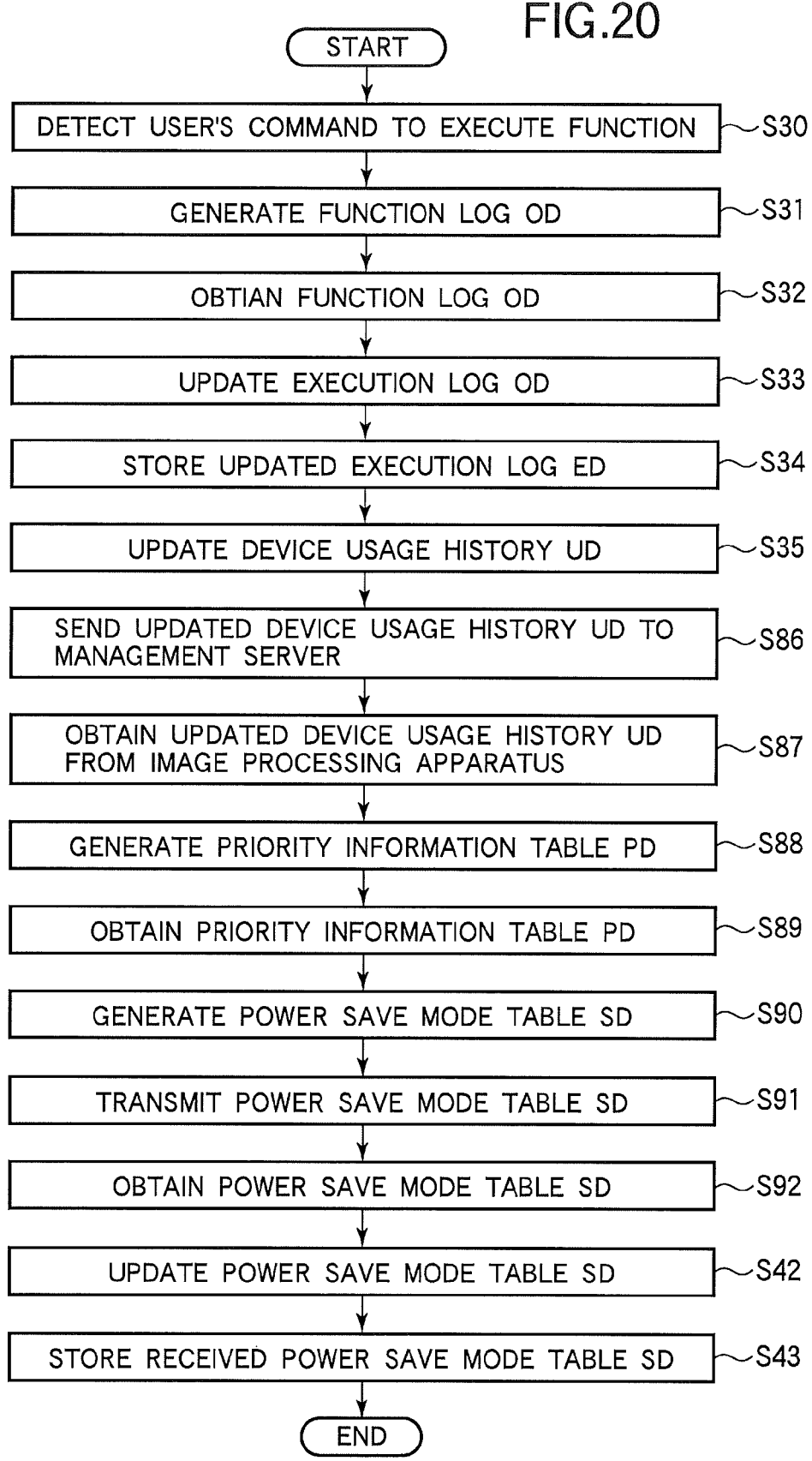

ELECTRONIC APPARATUS AND SYSTEM FOR PLACING PLURALITY OF DEVICES INTO CORRESPONDING POWER SAVE MODES ACCORDING TO PRIORITY LEVEL

BACKGROUND OF THE INVENTION

1. Field of the Invention

The present invention relates to an electronic apparatus and an electronic system that are configured to operate in a power save mode.

2. Description of the Related Art

Some existing electronic apparatus and systems are configured to operate both in a normal status and a power save mode. In the normal mode, an apparatus or system are fully powered and are ready for, for example, an incoming call. In the power save mode, electric power is supplied only to a core portion until an incoming call is received. One such apparatus is disclosed in Japanese Patent application Publication No. 2000-56869.

When an existing electronic apparatus enters a power save mode, the user is allowed to use only portions or functions of the apparatus to which electric power is actually supplied. One problem is that the portions or functions in the power save status are not necessarily used frequently by the user. This means that electric power is not efficiently used. Moreover, if the user wants to use portions or functions which are in the power save status, the apparatus needs to be switched from the power save mode to the normal mode. This causes inconvenience to the user.

SUMMARY OF THE INVENTION

An object of the invention is to provide an electronic apparatus and system that efficiently minimize power consumption while also improving ease of operation of the apparatus.

An electronic apparatus includes a plurality of devices configured to operate in a power save mode. A detecting section is configured to detect execution of the function of a device and identify a number of executions of each device. An obtaining section is configured to obtain a cumulative number of executions of the device based on the number of executions. A priority determining section is configured to determine a priority level of the device in being powered on normally, the priority level being determined in accordance with the frequency of use of the device. A power save mode selecting section holds a plurality of power save modes and configured to select a power save mode from among the plurality of power save modes in accordance with the priority level. A controller is configured to control the plurality of devices based on the selected power save mode.

An electronic system includes an electronic apparatus and a management server linked through a network. The electronic apparatus includes a plurality of devices. A detecting section is configured to detect execution of the function of a device and identify a number of executions of each device. An obtaining section is configured to generate cumulative number of executions of the device based on the number of executions, and holds the cumulative number of executions. A transmitter is configured to transmit the cumulative number of executions of the device to the management server. A receiver is configured to receive a power save mode for the device from the management server. A controller is configured to control the device based on the power save mode.

An electronic apparatus includes a receiver configured to receive the cumulative number of executions from the electronic apparatus, a priority determining section, and a transmitter. The priority determining section is configured to determine the priority level of the devices such that the devices having higher frequencies of use are given higher priority levels, and then generates a list of priority levels of devices. The transmitter holds a plurality of power save modes and configured to select a power save mode from among the plurality of power save modes in accordance with the priority level.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given byway of illustration only, and thus are not limiting the present invention, and wherein:

FIG. 1B is a block diagram illustrating the major portions of the image processing apparatus;

FIG. 20 is a flowchart illustrating the power save mode update processing of the second embodiment.

DETAILED DESCRIPTION OF THE INVENTION

First Embodiment

An electronic apparatus according to the present invention will be described by way of an image processing apparatus 101.

Figure 1A:
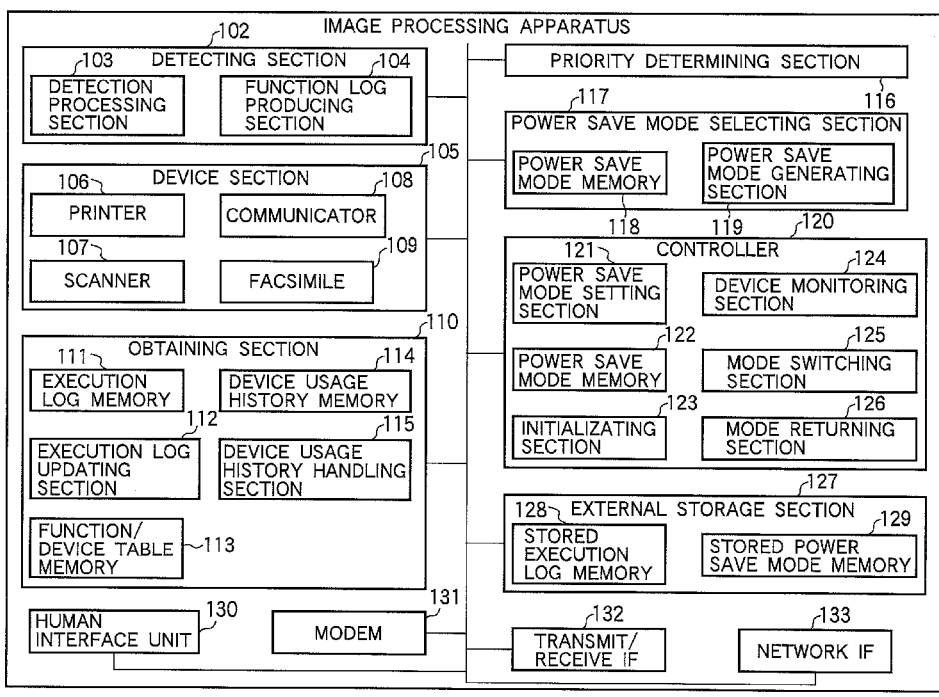
FIG. 1A is a block diagram illustrating the outline of the image processing apparatus according to a first embodiment.

FIG. 1A is a block diagram illustrating the outline of the image processing apparatus 101 according to a first embodiment. The image processing apparatus 101 includes a detecting section 102, a device section 105, an obtaining section 110, a priority determining section 116, a power save mode selecting section 117, a controller 120, an external storage section 127, a human interface unit 130, a modem section 131, a transmit/receive IF 132, and a network IF 133.

The detecting section 102 detects an event that occurs in the image processing apparatus 101, for example, when processing and functions (e.g., applications) are invoked. The detecting section 102 includes a detection processing section 103 and a function log producing section 104, and informs, for example, the obtaining section 110 and controller 120 of the detected event and function. The detection processing section 103 detects when the image processing apparatus 1 has received a command from a user. For example, the detection processing section 103 detects when the user depresses a copy key 130b or a scan key 130c at the human interface unit 130 to command a copy function or a scan function. Likewise, the detection processing section 103 detects when the image processing apparatus 101 has received a printing command from, for example, a PC (not shown) through, for example, a network. When the user depresses a power save key (e.g., a key 130g shown in FIG. 9) at the human interface unit 130, the detection processing section 103 informs the controller 120 of the depression of the power save key.

When the detection processing section 103 detects the depression of a specific key to command a specific function, the function log producing section 104 generates a function log OD indicative of the function to be performed and the number of executions of the function. The function log producing section 104 then sends the function log OD to the obtaining section 110.

FIG. 1B is a block diagram illustrating the major portions of the image processing apparatus 101 showing the flow of signals and data. The major portion of operation of the image processing apparatus 101 will be described with reference to FIG. 1A and FIG. 1B.

{Function Log OD}

Figure 2:
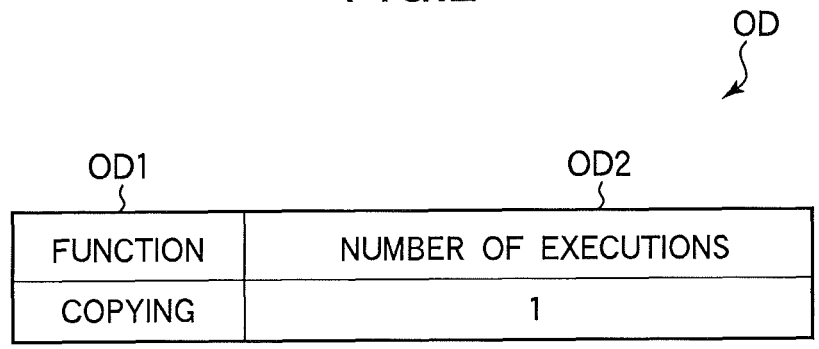
FIG. 2 illustrates function log in table form.

FIG. 2 illustrates the function log OD in table form. The function log OD includes a function field OD1 and a number-of-executions field OD2. The function field OD1 holds the name of a function. The number-of-executions OD2 field holds the number of times the function is to be executed. The function log producing section 104 may be configured to generate the function log OD every time the detection processing section 103 detects a command to execute a predetermined function (e.g., printing, copying, email transmission, email reception, networkPC transmission, Fax transmission, or Fax reception) to performed, and then send the generated function log OD to the obtaining section 110, in which case the value in the number-of-executions OD2 field is "1". Alternatively, the function log producing section 104 may be configured to update the function log OD every time the detection processing section 103 detects a command to execute a predetermined function to performed, and then sends the updated function log OD to the obtaining section 110 after a predetermined period of time or after a predetermined number of times the function log OD is updated, in which case the value in the number-of-executions OD2 field is larger than "1."

The device section 105 includes a group of hardware devices incorporated in the image processing apparatus 101, and software associated with these hardware devices. The device section 105 includes a plurality of devices, for example, a printer 106, a scanner 107, a communicator 108, and a facsimile 109. The printer 106 prints on a medium, for example, paper. The scanner 107 reads the image of a document, for example, printed paper. The communicator 108 transmits and receives information through the network. For example, the facsimile 109 transmits image data read by the scanner 107 to the telephone line through the communicator 108, and receives data from the telephone line through the communicator 108.

The obtaining section 110 determines, based on the function log OD, the cumulative number of executions that the device is used for performing a selected function. The obtaining section 110 includes an execution log memory 111, an execution log updating section 112, a function/device table memory 113, a device usage history memory 114, and a device usage history handling section 115. The execution log memory 111 holds an execution log ED that includes information on the function that the image processing apparatus 101 is commanded and information about the cumulative number of executions of the commanded function since a predetermined reference time. The predetermined reference time is, for example, the time at which the image processing apparatus 101 is shipped from the factory. Alternatively, the predetermined reference time may be when the user begins to use the image processing apparatus 101 or when the user inputs a command to obtain the execution log.

{Execution Log ED}

Figure 3:
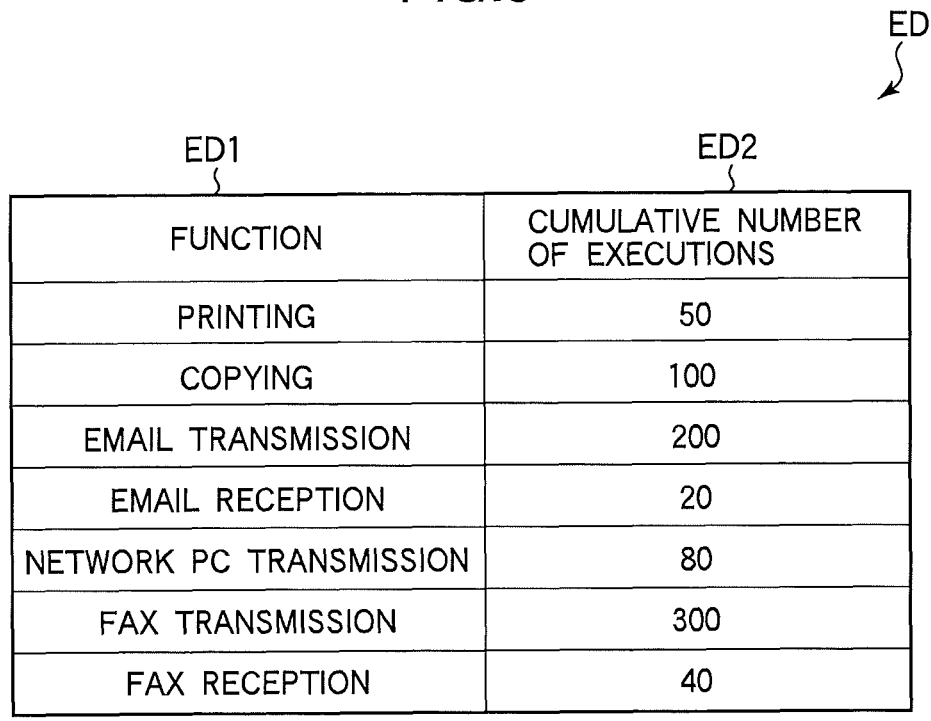
FIG. 3 illustrates the outline of the execution log.

FIG. 3 illustrates the outline of the execution log ED. The execution log ED is tabulated information, and includes a function field ED1 and an cumulative number-of-executions field ED2. The function field ED1 holds the names of commanded functions incorporated in the image processing apparatus 101. The cumulative number-of-executions field ED2 holds the cumulative number of executions of commanded functions. For example, the execution log ED shows that 200 emails have been transmitted and printing has been performed 50 times since a predetermined reference time.

Referring back to FIG. 1B, the execution log updating section 112 updates the execution log ED held in the execution log memory 111 based on the function log OD received from the function log producing section 104. The execution log updating section 112 stores the updated execution log ED into the external storage section 127, the updated execution log ED being stored as a stored execution log KED into a stored execution log memory 128.

{Function/Device Table TD}

Figure 4:
FIG. 4 illustrates the function/device table.

The function/device table memory 113 stores a function/device table TD for performing a selected function. FIG. 4 illustrates the function/device table TD which includes a function field TD1 and a device field TD2. The function field TD1 holds the names of functions. The device field TD2 holds the names of devices used for performing the corresponding functions in the function field TD1. The printer 106 performs printing. The scanner 107 and printer 106 cooperate to perform copying. The scanner 107 and communicator 108 cooperate to transmit emails. The printer 106 and communicator 108 cooperate to receive emails. The scanner 107 and communicator 108 cooperate to perform network PC transmission. The scanner 107 and facsimile 109 cooperate to transmit facsimiles. The facsimile 109 and printer 106 cooperate to receive facsimiles.

Referring back to FIG. 1B, the device usage history memory 114 holds a device usage history UD consisting of the name of a device used in the image processing apparatus 101 and the number of times the device has been used since the predetermined reference time.

Figure 5:
FIG. 5 illustrates the device usage history.

FIG. 5 illustrates the device usage history UD produced by combining the execution log ED shown in FIG. 3 with the function/device table TD shown in FIG. 4.

The device usage history UD is tabulated information and has a device field UD1 and a number-of-uses field UD2. The device field UD1 holds the names of devices and the number-of-uses field UD2 holds the number of uses of the devices in the device field UD1.

Figure 6:
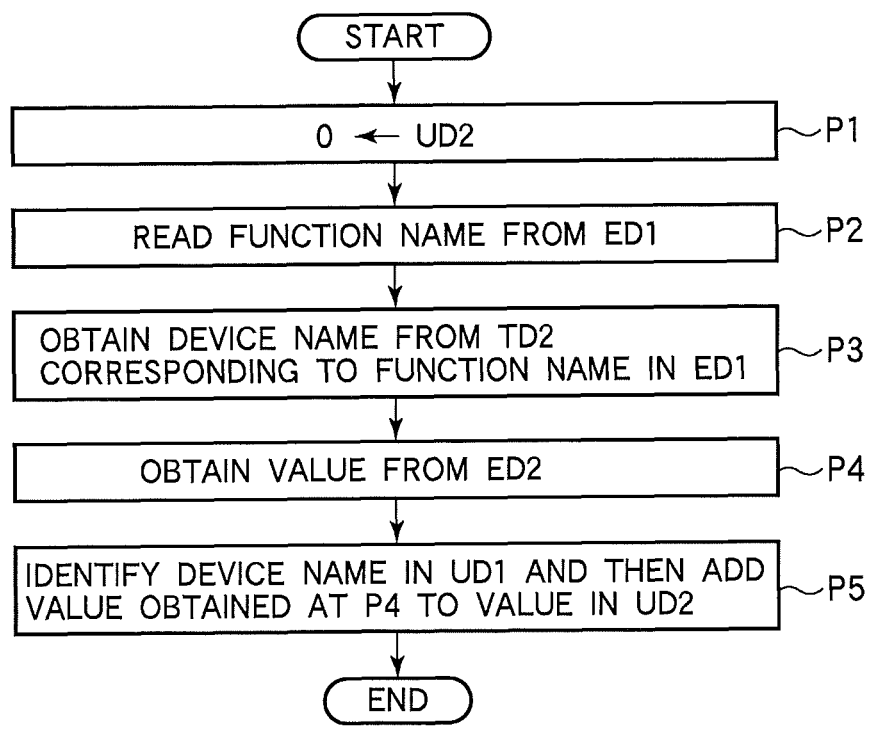
FIG. 6 illustrates the operation of the device usage history memory.

FIG. 6 illustrates the operation of the device usage history memory 114.

Referring to FIG. 6 and FIG. 1B, the device usage history handling section 115 updates the device usage history UD held in the device usage history memory 114 based on the execution log ED held in the execution log memory 111 and the function/device table TD held in the function/device table memory 113. For example, the device usage history handling section 115 resets all of the values in the number-of-uses field UD2 to zero (process 1). Subsequently, the device usage history handling section 115 extracts one function name of a function held in the function field ED1 (process 2). The device usage history handling section 115 then identifies a record having the same function name held in the function field TD1, thereby obtaining the corresponding device name from the device field TD2 of the identified record (process 3).

The device usage history handling section 115 obtains the value of cumulative number of executions held in the cumulative number-of-executions field ED2, which corresponds to the function name extracted at process 2 (process 4). The device usage history handling section 115, then, searches the device usage history UD to identify the device name obtained at process 3, and adds the value of cumulative number of executions obtained at process 4 to the corresponding value held in the number-of-uses field UD2 (process 5). The device usage history handling section 115 updates the device usage history UD by executing processes 2 to 5 for all functions held in the function field ED1.

Figure 7:
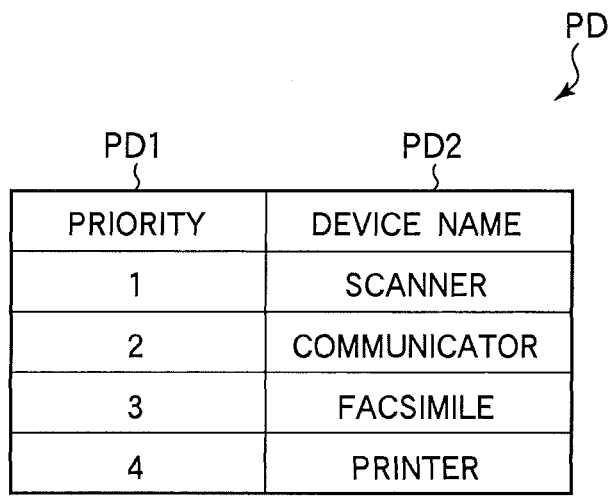
FIG. 7 illustrates the priority information table.

The priority determining section 116 determines priority levels in accordance with the frequency of use of the respective devices (FIG. 7). Priority level "1" is assigned to the normal operation mode. Priority level "2" is assigned to a power save mode. Priority levels "3" and "4" are assigned to a deep sleep mode. The smaller the value is, the higher the priority level is. For example, the priority level "1" implies that a corresponding device should remain powered on as long as possible. The priority determining section 116 generates priority information PD based on the device usage history UD. The priority levels are higher (i.e., smaller value) with increasing frequency of use of the devices.

FIG. 7 illustrates the priority information table PD. The priority information PD includes a priority field PD1 and a device name field PD2. The priority field PD1 holds the priority level of a device held in the device name field. The priority level is represented by an integer equal to or greater than 1. The device name field PD2 holds the device name of a device used for performing a selected function of the image processing apparatus 101.

Upon completion of the priority information PD, the priority determining section 116 sends the priority information PD to a power save mode selecting section 117.

The power save mode selecting section 117 selects an optimum power save mode from among a plurality of different power save modes in accordance with the current frequency of use of the respective devices in the image processing apparatus 101. The power save mode selecting section 117 includes a power save mode memory 118 and a power save mode generating section 119. The power save mode memory 118 holds a priority/power save mode table CD.

Figure 8:
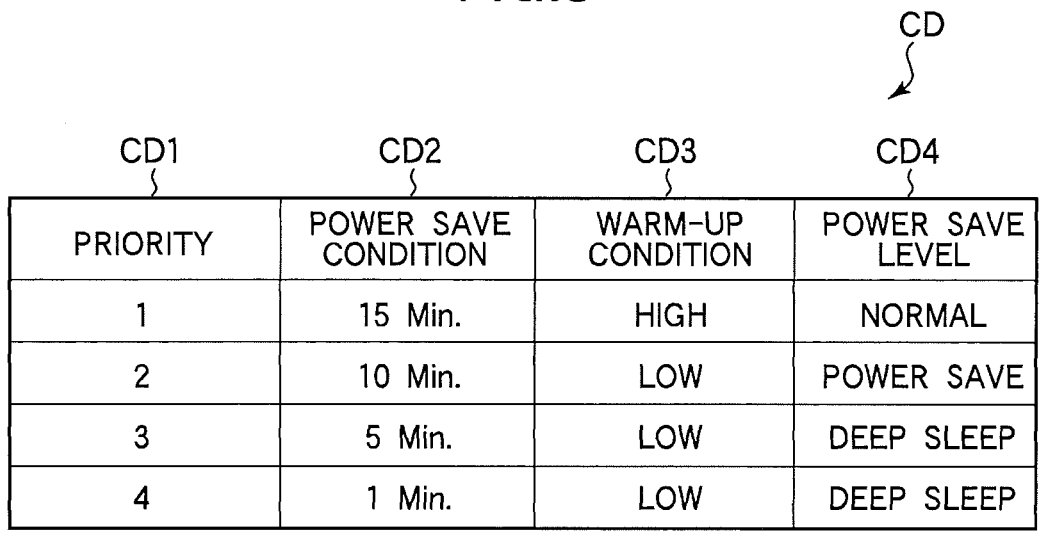
FIG. 8 illustrates the power save mode table.

FIG. 8 illustrates the power save mode table CD that includes a priority field CD1, a power save condition field CD2, a warm-up condition field CD3, and a power save level field CD4. The priority field CD1 holds the priority levels for the respective devices. The priority levels correspond to those in the priority field PD1 shown in FIG. 7. In the first embodiment, the power save condition, warm-up condition, and power save level constitute the power save mode. The power save modes for devices having different priority levels differ in at least one of the power save condition, warm-up condition, and power save level. Each record in the table shown in FIG. 8 represents a power save mode different from remaining records. For example, a record containing a priority level "2," power save condition "10 min.," warm-up condition "low", and power save level "power save" define a power save mode. A record containing a priority level "2," power save condition "10 min.," warm-up condition "low", and power save level "power save" define another power save mode.

The power save condition field CD2 holds power save conditions under which the devices enter their corresponding power save levels. The power save conditions are set in terms of a period of time during which the device remain idle (i.e., not in use). If a device remains idle longer than the period of time, the device enters a corresponding one of the plurality of different power save modes. The longer the period of time is, the higher the priority level is.

A warm-up condition field CD3 holds a condition or a criterion under which if a user commands to enter one of the plurality of power save modes, a device having a priority level indicated in the priority field CD1 should be returned to the "normal status" or should remain in the same power save level. When a device has a priority level associated with a warm-up condition or a criterion "HIGH" and is in the "power save mode" or in the "deep sleep mode," if the user commands through the human interface unit 130 to enter one of the plurality of power save modes, the device is set to the "normal status." All remaining devices having priority levels not associated with the warm-up condition or a criterion "HIGH" are maintained in the power save levels immediately before the user commands to enter one of the plurality of power save modes.

The power save level field CD4 holds information indicative of a power save level which a device having a priority level held in the priority field CD1 should enter upon power up of the image processing apparatus 101.

For example, "NORMAL" indicates that a device having a priority level "1" held in the priority field CD1 enters the "normal status" upon power-up of the image processing apparatus 101. The "normal status" is such that the device is initialized, electric power is supplied to the device, and the device is ready for use. When the user commands the image processing apparatus 101 to perform the function of a device which is currently in the normal status, the device need not be initialized or be powered on.

The "POWER SAVE" indicates that a device having a priority level "2" held in the priority field CD1 enters the "power save status" upon power-up of the image processing apparatus 101. The "power save status" is such that the device is initialized and electric power is supplied only to a part of the device so as to consume less electric power than the "normal status." When the user commands the image processing apparatus 101 to perform the function of the device in the power save status, the device in the "power save status" is not initialized but electric power is supplied to the entire device.

The "DEEP SLEEP" indicates that a device having priority levels "3" and "4" held in the priority field CD1 has entered the "deep sleep status" upon power-up of the image processing apparatus 101. The "deep sleep status" is such that the device is not initialized and electric power is not supplied to the device. When the user commands the image processing apparatus 101 to perform the function of a device which is currently in the deep sleep status, the device in the "deep sleep status" is initialized and electric power is supplied to the entire device so that the device is ready for use.

Referring to FIG. 1B, the power save mode generating section 119 generates a power save mode table SD based on the priority information PD and the power save mode table CD. For example, the power save mode generating section 119 selects the power save mode corresponding to the priority level in the priority information PD from the power save mode table CD, thereby generating the power save mode table SD.

Figures 9, 10:
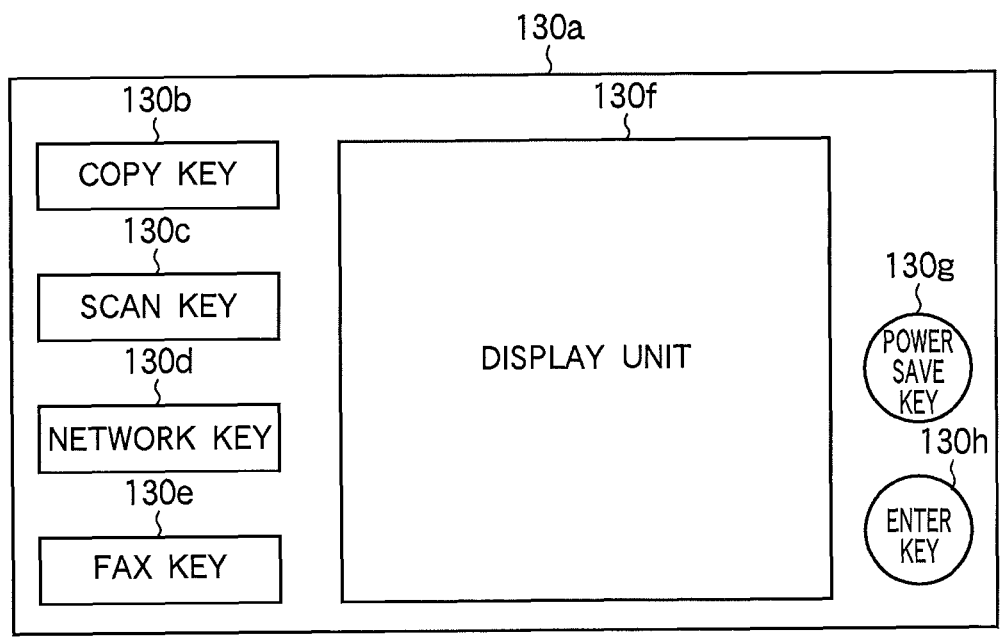
FIG. 9 illustrates the power save mode table.
FIG. 10 illustrates the operation panel.

FIG. 9 illustrates the power save mode table SD that includes a device name field SD1, a power save condition field SD2, a warm-up condition field SD3, and a power save level field SD4. The contents in the power save condition field SD2, warm-up condition field SD3, and power save level field SD4 are the same as those in the power save condition field CD2, warm-up condition field CD3, and power save level field CD4, respectively. The device name field SD1 holds information indicative of a device used for performing a selected function of the image processing apparatus 101. The power save condition field SD2 holds the condition under which the device in the device name field SD1 enters the power save status. The warm-up condition field SD3 holds the warm-up condition under which the device in the device name filed SD1 returns to the "NORMAL." The power save level field SD4 holds the power save level which the device in the device name field SD1 enters.

Referring to FIG. 1B, the power save mode generating section 119 then sends the power save mode table SD to the controller 120.

Using the power save mode table SD, the controller 120 places the respective devices in optimum power save modes in accordance with the frequency of use of the respective devices. The controller 120 includes a power save mode setting section 121, a power save mode memory 122, an initializing section 123, a device monitoring section 124, a mode switching section 125, and a mode returning section 126.

The power save mode setting section 121 of the controller 120 receives the power save mode SD from the power save mode generating section 119, and stores the power save mode SD into the power save mode memory 122. If the power save mode memory 122 already holds the power save mode SD thereon, the power save mode setting section 121 updates the power save mode SD by replacing the old power save mode SD with new power save mode SD. The power save mode setting section 121 also sends the power save mode SD to a stored power save mode memory 129 of the external storage section 127, which, in turn, stores the power save mode SD as stored power save mode KSD.

{Power on of Image Processing Apparatus}

Once the image processing apparatus 101 is powered on, the initializing section 123 performs initialization of the image processing apparatus 101. Upon power-up of the image processing apparatus 101, the initializing section 123 obtains the stored power save mode KSD from the stored power save mode memory 129 of the external storage section 127, and then sends the stored power save mode KSD to the power save mode memory 122 which, in turn, stores the stored power save mode KSD as the power save mode SD. The initializing section 123 also obtains the stored execution log KED from the stored execution log memory 128, and then sends the stored execution log KED into the execution log memory 111 which, in turn, stores the stored execution log KED as the execution log ED.

When the initializing section 123 performs initialization of the image processing apparatus 101, the initializing section 123 causes the respective devices to enter the corresponding power save levels, in accordance with the power save mode SD held in the power save mode memory 122.

The device monitoring section 124 determines the time during which the respective devices of the device section 105 remain idle, the time being an elapsed time from when the respective devices completed their last operations or from when the initialization of the image processing apparatus 101 completed.

The mode switching section 125 of the controller 120 places the devices, which meet the power save condition, in the power save status. For example, when a device is not used longer than the threshold time, the mode switching section 125 sends a power save mode command to the device, thereby placing the device in the power save status.

In response to the user's command, the mode returning section 126 causes the device in the power save status to return to the normal status. For example, when the user selects a function through the human interface unit 130, if the device that should perform the selected function is in the power save status or the deep sleep status, the device returns to the normal status. When the detection processing section 103 informs the mode returning section 126 of depression of the power save key, the mode returning section 126 places the device having the warm-up condition "HIGH" in the normal status in accordance with the power save mode table SD held in the power save mode memory 122. For example, when such a device is in the power save status or in the deep sleep status, the mode returning section 126 causes the device to enter the normal status. If the device is already in the normal status, the mode returning section 126 maintains the device in the normal status.

The external storage section 127 is a non-volatile external storage apparatus in the form of, for example, an EEPROM, flash ROM, or HDD. These non-volatile memories are capable of holding information even after the image processing apparatus is turned off. The external storage section 127 includes the stored execution log memory 128 and the stored power save mode memory 129. The stored execution log memory 128 receives the execution log ED from the execution log updating section 112, and stores the execution log ED as the stored execution log KED therein. The stored power save mode memory 129 receives the power save mode SD from the power save mode setting section 121, and stores the power save mode SD as the stored power save mode KSD therein.

The human interface unit 130 receives inputs from the user. The human interface unit 130 may be formed of an operation panel 130a shown in FIG. 10. FIG. 10 illustrates the operation panel 130a. The operation panel 130a includes the copy key 130b, the scan key 130c, a network key 130d, a FAX key 130e, a display unit 130f, the power save key 130g, and an ENTER key 130h. The detecting section 102 detects when the user depresses a key on the operation panel 130a. When the user wants to select the copy function, he depresses the copy key 130b. When the user wants to select the scan function, he depresses the scan key 130c. When the user wants to select the network PC transmission function, he depresses the network key 130d. When the user wants to select the FAX function, he depresses the FAX key 130e. The display unit 130f displays, for example, a function screen that displays the menu screen of the image processing apparatus 101 and functions performed in the image processing apparatus 101, and is implemented with an LCD display. The copy key 130*b*, scan key 130*c*, network key 130*d*, FAX key 130*e*, power save key 130*g*, and ENTER key 130*h* may also be implemented with a touch screen. When the user wants to command power saving, he depresses the power saving key 130*g*. The user depresses the ENTER key 130*h* to command execution of a function selected by depressing a corresponding one of the copy key 130*b*, scan key 130*c*, network key 130*d*, and FAX key 130*e*. The detecting section 102 detects when the ENTER key 130*h* is depressed.

A modem 131 is an interface used when information is communicated over a telephone line. A transmit/receive IF 132 transmits a communication request from the image processing apparatus 101 to the network through a network IF 133. Thus, the transmit/receive IF 132 and network IF 133 operate as a transmitter and a receiver, respectively, and communicate information over the network.

{Power-Up of Apparatus}

Figure 11:
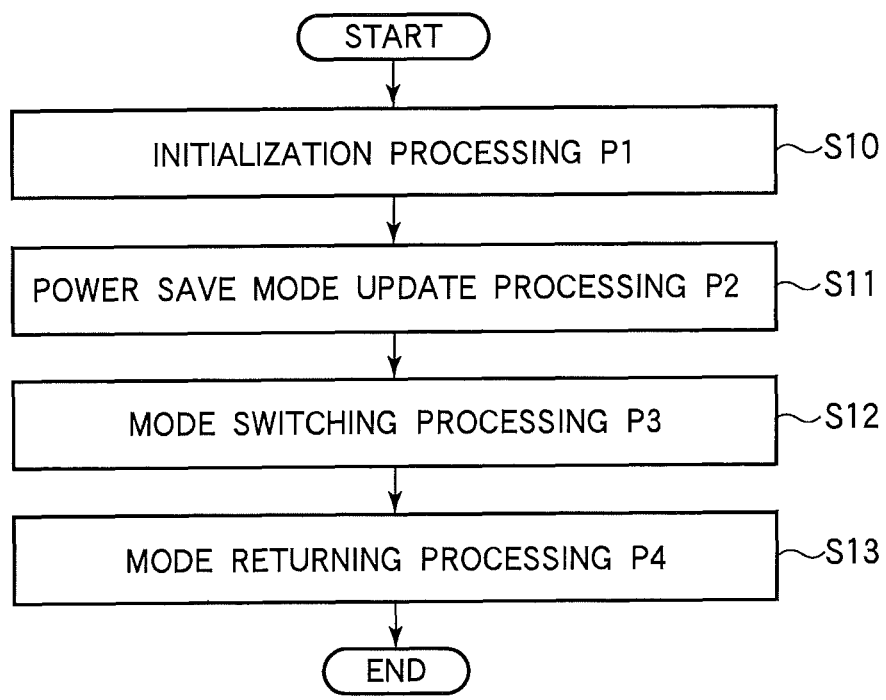
FIG. 11 is a flowchart illustrating processing for turning on the image processing apparatus.

FIG. 11 is a flowchart illustrating processing for turning on the image processing apparatus 101. Once the image processing apparatus 101 has been turned on, the image processing apparatus 101 performs initialization processing P1 (S10). Upon completion of the initialization processing P1, the image processing apparatus 101 performs power save mode update processing P2 in which the power save mode of the respective devices is updated (S11). Upon completion of the power save mode update processing P2, the image processing apparatus 101 performs mode switching processing P3 in which idle devices enter their corresponding power save levels in accordance with the power save mode of the respective device (S12). Subsequently, the image processing apparatus 101 performs mode returning processing P4 in which devices in the power save status or in the deep sleep status return to the normal status in response to the user's command (S13).

It is to be noted that steps S11 to S13 may be carried out in any order or even in parallel. Steps S11 to S13 are repeatedly carried out while the image processing apparatus 101 remains turned on.

{Initialization Processing P1}

Figure 12:
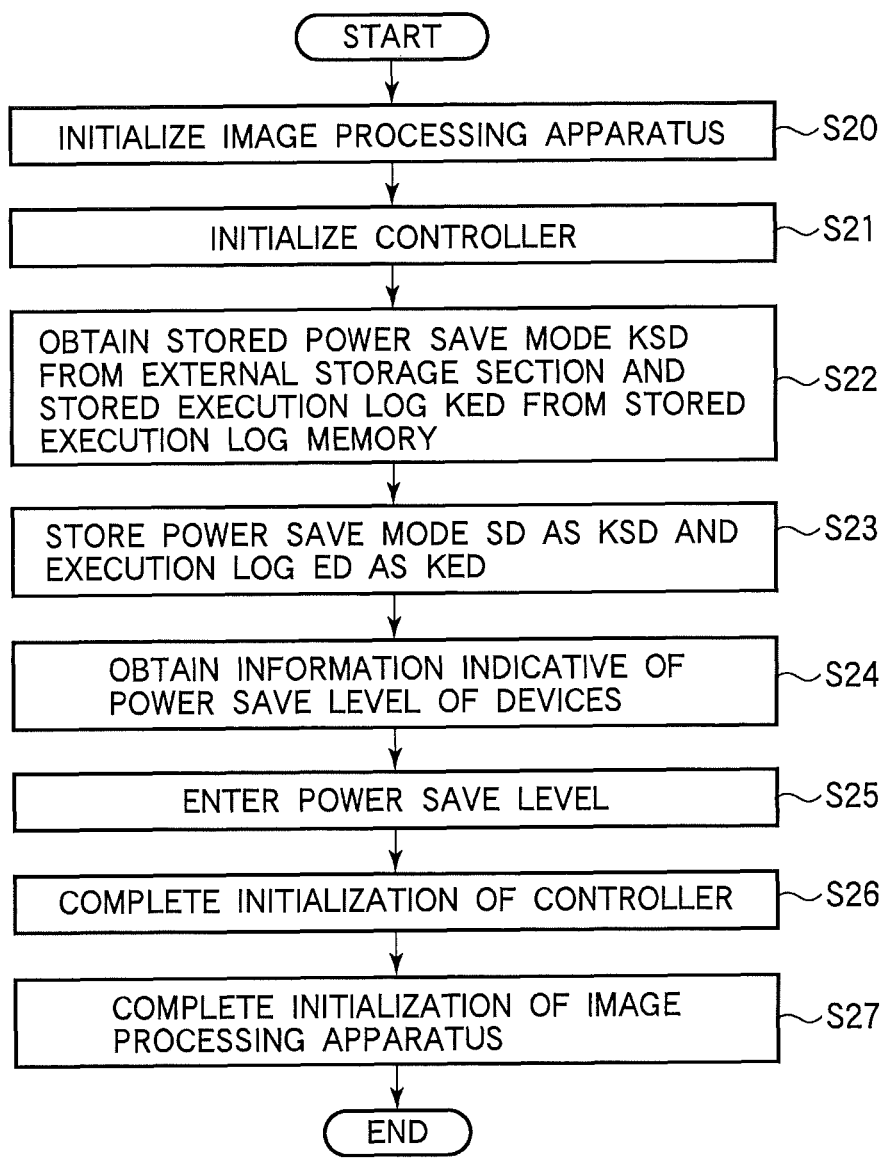
FIG. 12 is a flowchart illustrating the initialization processing P1.

FIG. 12 is a flowchart illustrating the initialization processing P1 of the image processing apparatus 101. The initialization processing P1 will be described with reference to FIG. 12 and FIG. 1B.

Upon power-up of the image processing apparatus 101, the initializing section 123 begins to initialize the image processing apparatus 101 (S20). The initializing section 123 first begins to initialize the controller 120, which is a part of the initialization of the image processing apparatus 101 (S21).

The initializing section 123 obtains the stored power save mode KSD from the stored power save mode memory 129 of the external storage section 127, and the stored execution log KED from the stored execution log memory 128 (S22). The initializing section 123 sends the stored power save mode KSD to the power save mode memory 122 which, in turn, stores the stored power save mode KSD as the power save mode table SD. The initializing section 123 also sends the stored execution log KED to the execution log memory 111 which, in turn, stores the stored execution log KED as the execution log ED (S23).

Next, the initializing section 123 obtains information indicative of the power save level of the respective devices held in the device section 105 using the power save mode SD held in the power save mode SD memory 122 (S24). The initializing section 123 then causes the respective device held in the device section 105 to enter the power save level indicated by the information obtained at S24 (S25). For example, according to the power save mode SD, the scanner 107 is set to the normal level. The facsimile 109 is set to the power save status. The communicator 108 is set to the deep sleep status. The printer 106 is set to the deep sleep status. The initializing section 123 completes the initialization of the controller 120 (S26), and the initialization of the image processing apparatus 101 (S27).

{Power Save Mode Update Processing P2}

Figure 13:
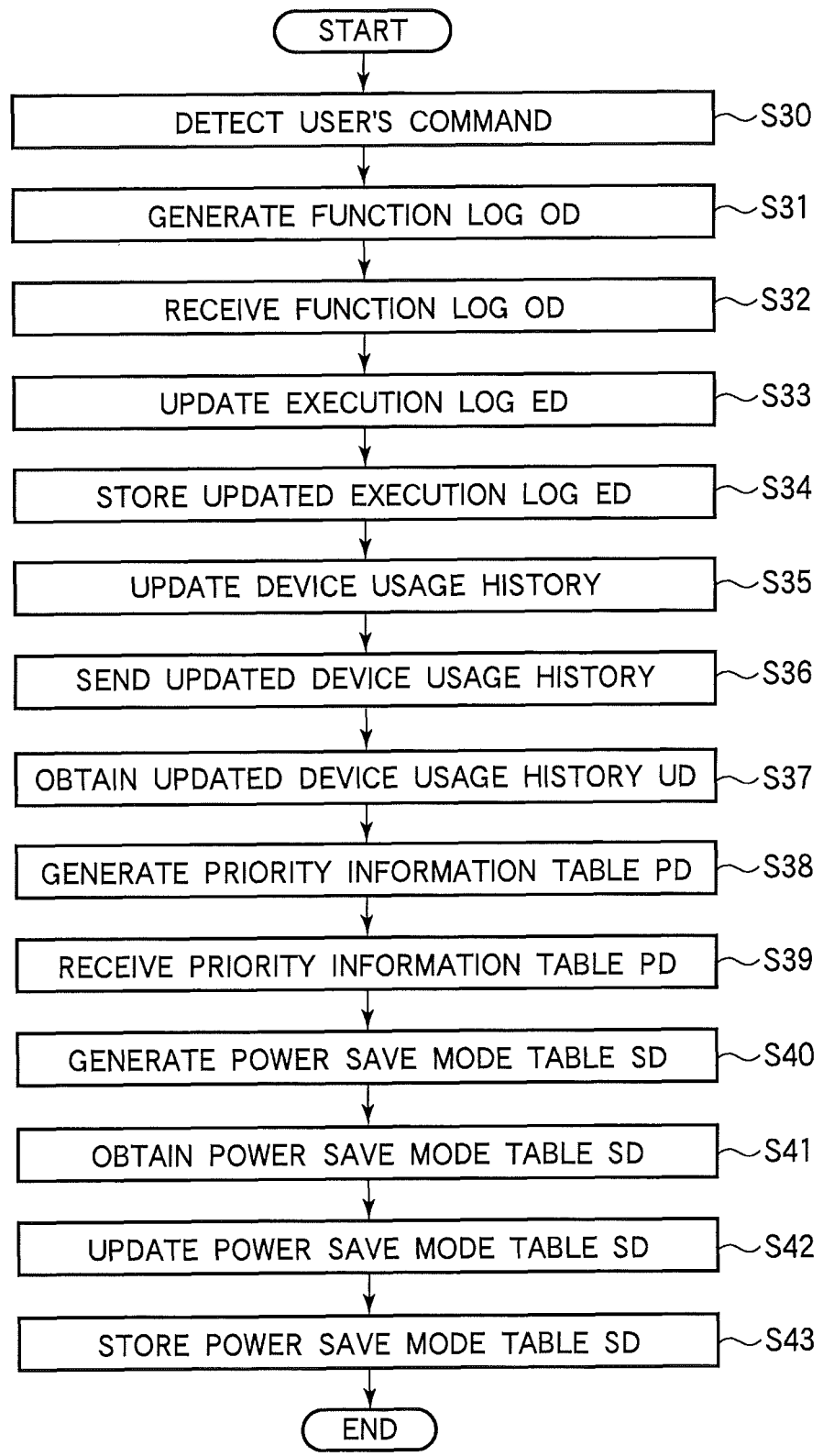
FIG. 13 is a flowchart illustrating the power save mode update processing.

FIG. 13 is a flowchart illustrating the power save mode update processing P2 for the image processing apparatus 101. The power save mode update processing P2 will be described with reference to FIG. 13 and FIG. 1B.

The detecting section 103 detects when the user commands the execution of a function via the human interface unit 130 or a PC (not shown) (S30). For example, assume that the user depresses the copy key 130*b* and then the ENTER key 130*h*. The detecting section 103 detects depression of the copy key 130*b*.

The function log producing section 104 generates the function log OD having "copying" in the function field OD1 and "1" in the number-of-executions field OD2 (see FIG. 2) (S31). For example, the function log OD has "COPYING" in the function field OD1 and "1" in the number-of-executions field OD2 (FIG. 2). The value in the number-of-executions field OD2 is always "1" if the function log OD is created every time a commanded function is executed. Alternatively, the value in the number-of-executions field OD2 may be a cumulative number of executions.

The function log producing section 104 then sends the function log OD generated at S31 to the obtaining section. The execution log updating section 112 of the obtaining section 110 receives the function log OD (S32).

The execution log updating section 112 updates the execution log ED held in the execution log memory 111 with the function log OD obtained at S32 (S33). The execution log updating section 112 searches the execution log ED held in the execution log memory 111 to identify a record in which function name held in the function field OD1 of the function log OD and the function name held in the function field ED1 coincide. The execution log updating section 112 then adds the number-of-executions held in the number-of-executions field OD2 of the function log OD to the cumulative number-of-executions held in the cumulative number-of-executions field ED2 in the identified record. For example, the execution log updating section 112 adds "1" to the value in the cumulative number-of-executions field ED2 of the record that holds "copying" in the function field ED1 of the execution log ED.

The execution log updating section 112 sends the updated execution log ED to the external storage section 127 which, in turn, holds the updated execution log ED as stored execution log KED (S34).

Next, the device usage history handling section 115 updates the device usage history UD held in the device usage history memory 114, with the execution log ED updated at S33 and the function/device table TD held in the function/device table memory 113 (S35). For example, according to the function/device table TD, the scanner and printer are used in copying. Therefore, if the number of executions of "copying" in the execution log ED is incremented by "1," the number of uses of the scanner and printer held in the device usage history UD are also incremented by "1," respectively. The device usage history handling section 115 may perform S35 every time the execution log ED is updated at S33. The device usage history handling section 115 may perform S35 after a predetermined number of updates of the execution log ED. Still alternatively, the device usage history handling section 115 may perform S35 after elapse of a predetermined time.

Next, the device usage history handling section 115 sends the updated device usage history UD to the priority determining section 116 (S36). The priority determining section 116 obtains the updated device usage history UD (S37).

Based on the updated device usage history UD obtained at S37, the priority determining section 116 generates the priority information table PD (S38). For example, the priority determining section 116 refers to the updated device usage history UD, and generates the priority information table PD (FIG. 7) such that the devices having higher frequencies of use are given higher priority levels.

The priority determining section 116 sends the priority information table PD generated at S38 to the power save mode selecting section 117. The power save mode generating section 119 of the power save mode selecting section 117 receives the priority information table PD (S39).

The power save mode generating section 119 generates the power save mode table SD based on the priority information table PD received at S39 and the power save mode table CD held in the power save mode memory 118 (S40). For example, the power save mode generating section 119 obtains a combination of a priority level and a device name for each record (レコード) in the priority information table PD. The power save mode generating section 119 then selects a power save mode from the power save mode table CD that corresponds to the obtained priority level. The power save mode generating section 119 then combines the obtained device name with the selected power save mode to generate the power save mode table SD (FIG. 9).

The power save mode generating section 119 sends the power save mode table SD generated at S40 to the controller 120. The power save mode setting section 121 of the controller 120 obtains the power save mode table SD (S41). The power save mode setting section 121 then updates the power save mode table SD held in the power save mode memory 122 with the power save mode table SD obtained at S41 (S42). Specifically, the power save mode setting section 121 replaces the old power save mode table SD held in the power save mode memory 122 with the new power save mode table SD.

The power save mode setting section 121 stores the power save mode table SD obtained at S41 into the external storage section 127 which, in turn, holds the power save mode table SD as the stored power save mode KSD (S43).

{Mode Switching Processing P3}

Figure 14:
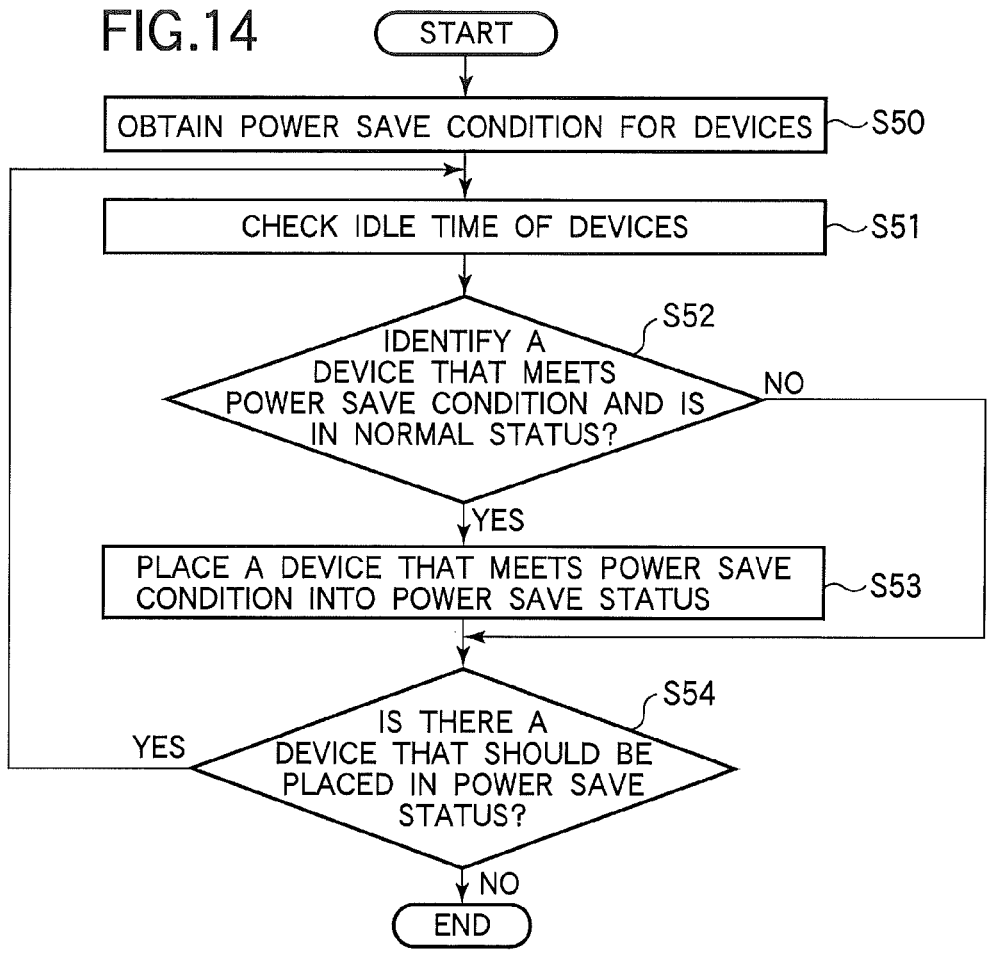
FIG. 14 is a flowchart illustrating the mode switching processing.

FIG. 14 is a flowchart illustrating the mode switching processing P3 of the image processing apparatus 101. The mode switching section 125 searches the power save mode memory 122 for the power save mode table SD, thereby obtaining the power save conditions for the respective devices (S50). For example, if the save mode table SD looks like that shown in FIG. 9, the power save condition is 15 minutes for the scanner 107, 10 minutes for the facsimile 108, 5 minutes for the communicator 108, and 1 minute for the printer 106.

The mode switching section 125 checks the idle time of the respective devices that are being timed by the device monitoring section 124 (S51). The mode switching section 125 then identifies a device that meets the power save condition obtained at S50 and that is in the normal status (S52). Specifically, if the idle time of the respective devices determined at S51 is longer than the power save condition obtained at S50, it is determined that the power save condition obtained at S50 is met and the device is in the normal status. If a device meets the power save condition (YES at S52), the mode switching section 125 proceeds to S53. If no device meets the power save condition (NO at S52), the mode switching section 125 proceeds to S54.

At S53, the mode switching section 125 causes the device, which meets the power save condition, to enter the power save status. The mode switching section 125 then makes a decision to determine whether there is a device that should be placed in the power save status (S54). If the answer is YES at S54, the process jumps back to S51. If the answer is NO at S54, the mode switching section 125 completes the processing. In other words, it is determined at S51-S54 whether there is a device that is in the normal status but should enter the power save status, and if such a device exists, the device is shifted to the power save status.

After the image processing apparatus 101 has been turned on, the steps shown in FIG. 14 are executed repeatedly. However, if all of the devices of the image processing apparatus 101 are in the power save status or in the deep sleep status, the processing shown in FIG. 14 may be halted and may be resumed if at least one device enters the normal status.

The mode switching section 125 may be configured to cause a device to enter the deep sleep status if the device remains in the power save status longer than a predetermined time. The predetermined time may be different depending on the priority levels of the respective devices. For example, the higher the priority level is, the longer the predetermined time.

{Mode Returning Processing P4}

Figure 15:
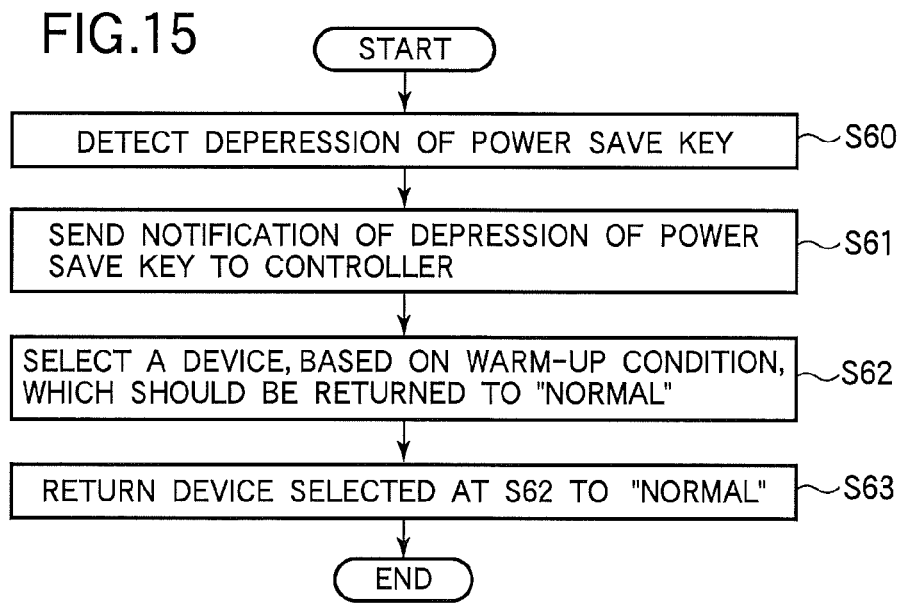
FIG. 15 is a flowchart illustrating the mode returning processing.

FIG. 15 is a flowchart illustrating the mode returning processing P4 of the image processing apparatus 101. When at least one device is in the power save status, if the user depresses the power save key 130g of the operation panel 130a, the detection processing section 103 detects the depression of the power save key 130g (S60), and sends a notification of the depression of the power save key 130g to the controller 120 (S61).

When the controller 120 receives the notification issued at S61, the mode returning section 126 refers to the power save mode table SD stored in the power save mode memory 122, thereby selecting a device, based on the warm-up condition, which should be returned to the "NORMAL" (S62). For example, the mode returning section 126 selects a device whose warm-up status is "HIGH". If the device selected at S62 is in the power save status or in the deep sleep status, the mode returning section 126 causes the device selected at S62 to return to the "NORMAL" (S63).

As described above, the first embodiment offers the following advantages. Based on the history of usage of the respective devices of the image processing apparatus 101, an optimum power save mode is automatically selected. This eliminates waste of electric power and improves operability of the image processing apparatus 101.

Second Embodiment

Figure 16:
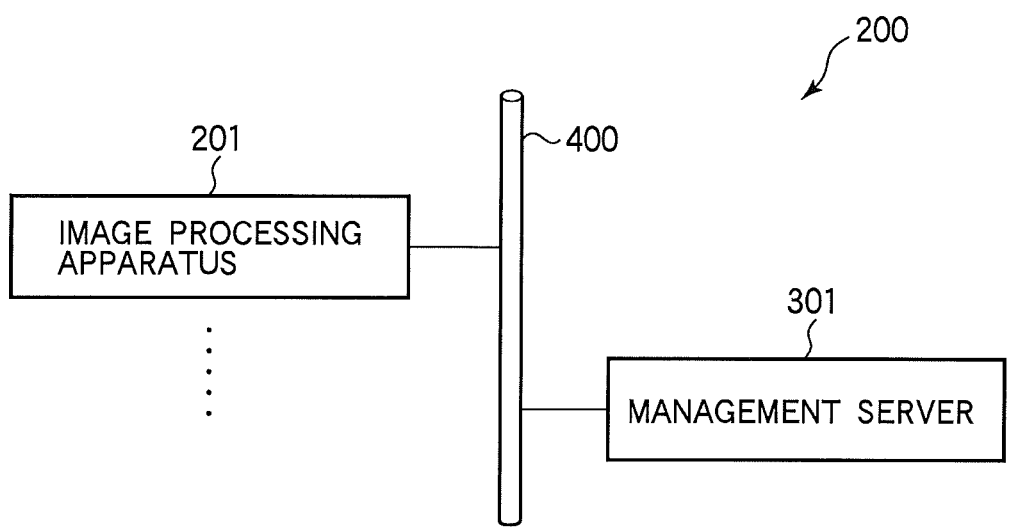
FIG. 16 illustrates the outline of the configuration of the image processing system according to a second embodiment.

A second embodiment will be described by way of example of an image processing system 200. FIG. 16 illustrates the outline of the configuration of the image processing system 200. The image processing system 200 includes a plurality of image processing apparatus 201 and a management server 301 that manages the power save mode of the plurality of image processing apparatus 201. The image processing apparatus 201 and the management server 301 are connected to a network 400.

Figure 17A:
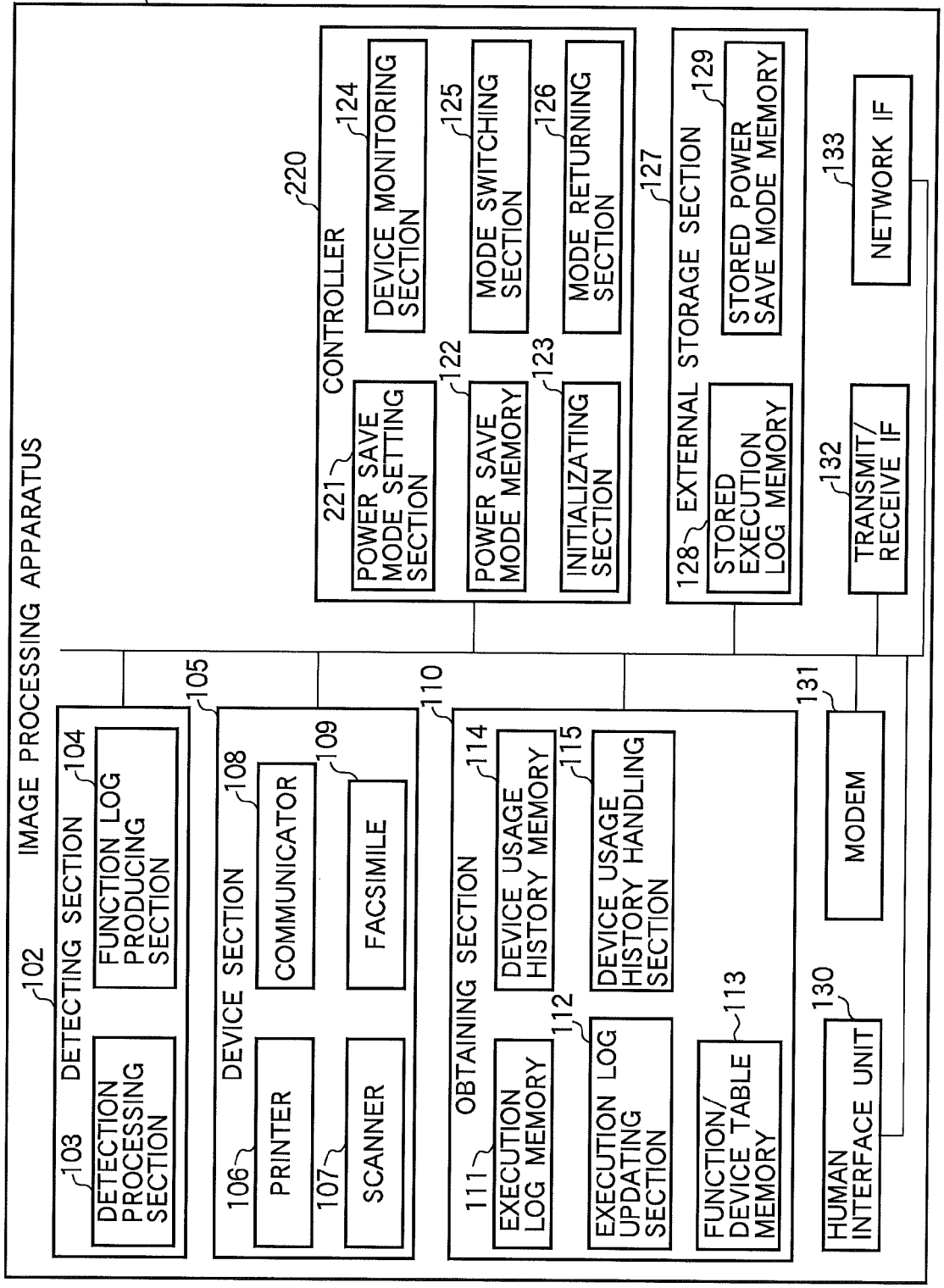
FIG. 17A is a block diagram illustrating the general configuration of the image processing apparatus.

FIG. 17A is a block diagram illustrating the general configuration of the image processing apparatus 201.

The image processing apparatus 201 includes a detecting section 102, a device section 105, an obtaining section 210, a controller 220, an external storage section 127, a human interface unit 130, a modem section 131, a transmit/receive IF 132, and a network IF 133. The image processing apparatus 201 has substantially the same configuration as the image processing apparatus 101 but differs from the image processing apparatus 101 in that the priority determining section 116 and power save mode selecting section 117 are not employed, and in that the obtaining section 210 and the controller 220 operate in different ways from the obtaining section 110 and the controller 120, respectively.

The obtaining section 210 includes an execution log memory 111, an execution log updating section 112, a function/device table memory 113, a device usage history memory 114, and a device usage history handling section 215. The obtaining section 210 has substantially the same configuration as the obtaining section 110 but differs from the obtaining section 110 in that the device usage history handling section 215 operates in a different manner.

Figure 17B:
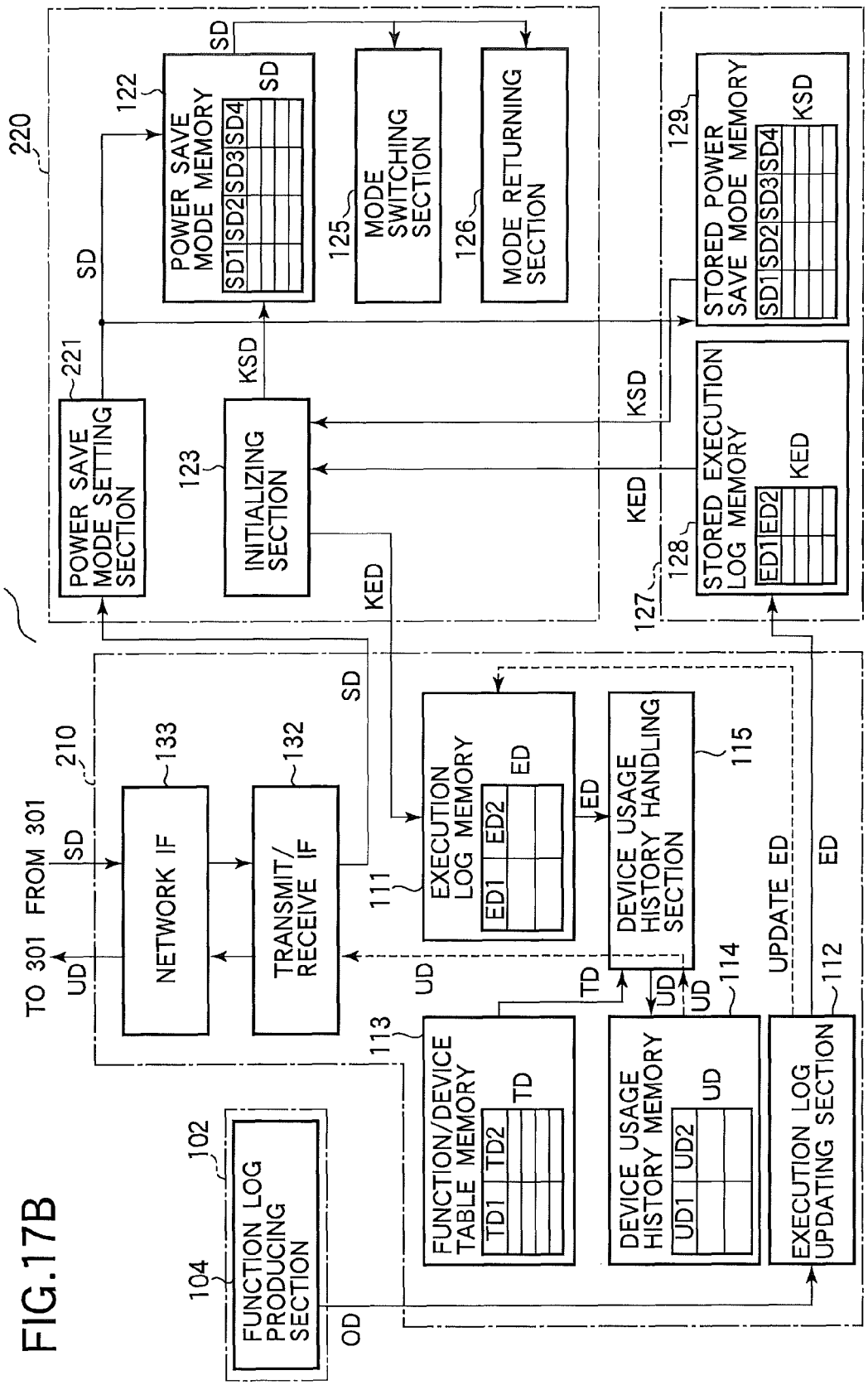
FIG. 17B illustrates the major portion of the image processing apparatus.

FIG. 17B illustrates the major portion of the image processing apparatus 201 showing the flow of signals or data.

Just as in the first embodiment, the device usage history handling section 215 generates or updates a device usage history UD based on an execution log ED and a function/device table TD. Unlike the first embodiment, the device usage history handling section 215 obtains the device usage history UD from the device usage history memory 114, and sends the obtained device usage history UD to the management server 301 via the transmit/receive IF 132 and the network IF 133.

The controller 220 includes a power save mode setting section 221, a power save mode memory 122, an initializing section 123, a device monitoring section 124, a mode switching section 125, and a mode returning section 126. The controller 220 has substantially the same configurations as the controller 120 (first embodiment) but differs from the controller 120 in that the power save mode setting section 221 processes data in a different manner.

The power save mode setting section 221 obtains a power save mode table SD from the management server 301 via the transmit/receive IF 132 and network IF 133. The power save mode setting section 221 stores the power save mode table SD into the power save mode memory 122. If the power save mode memory 122 already holds the power save mode table SD therein, the power save mode setting section 221 deletes the current power save mode table SD from the power save mode memory 122, and stores a new power save mode table SD into the power save mode memory 122, thereby updating the power save mode table SD in the power save mode memory 122. The power save mode setting section 221 also sends the new power save mode table SD to the power save mode memory 129 of the external storage section 127 which, in turn, stores the received power save mode table SD therein as stored power save mode KSD.

Figure 18A:
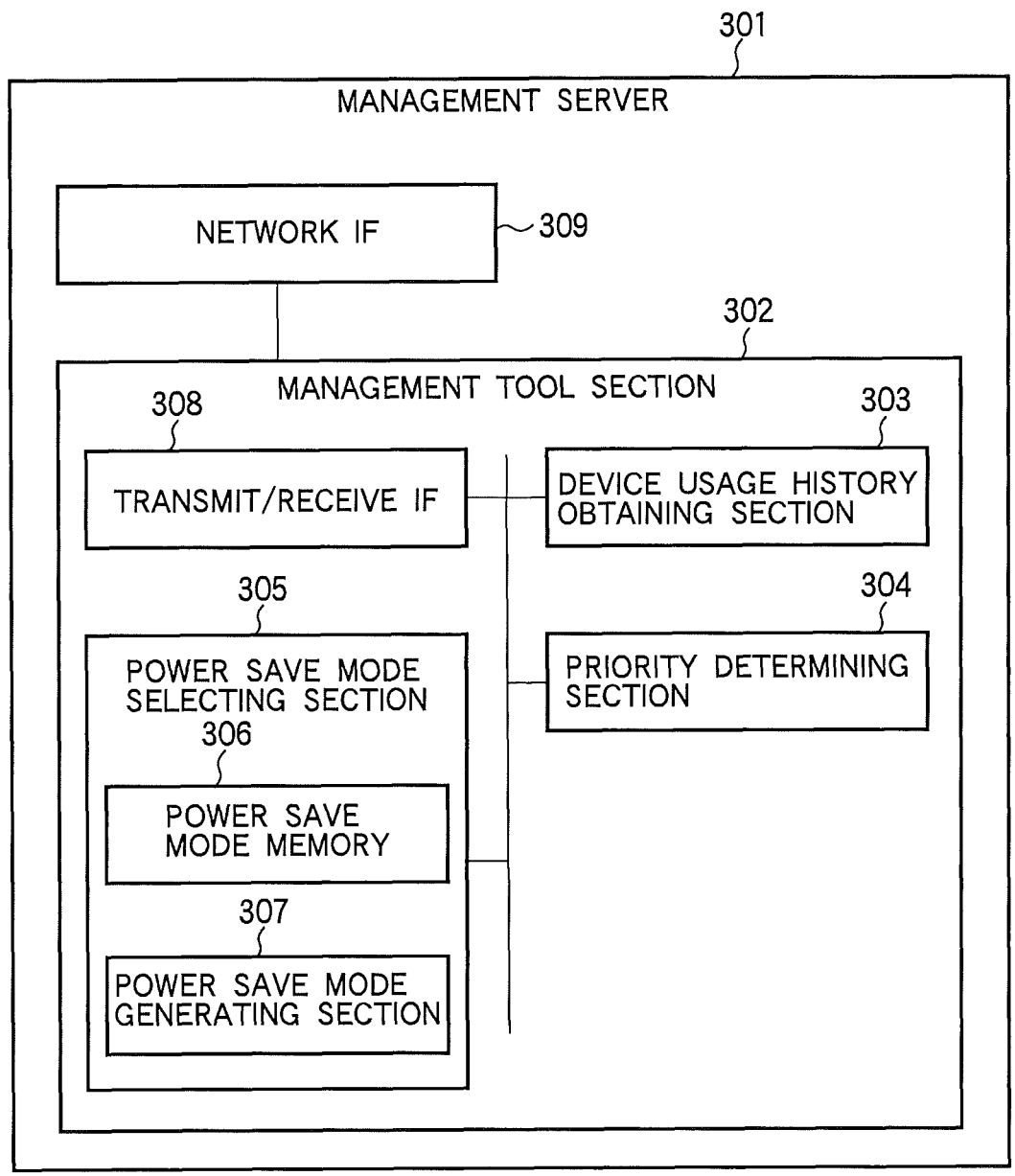
FIG. 18A is a block diagram illustrating the general configuration of the management server.
Figure 18B:
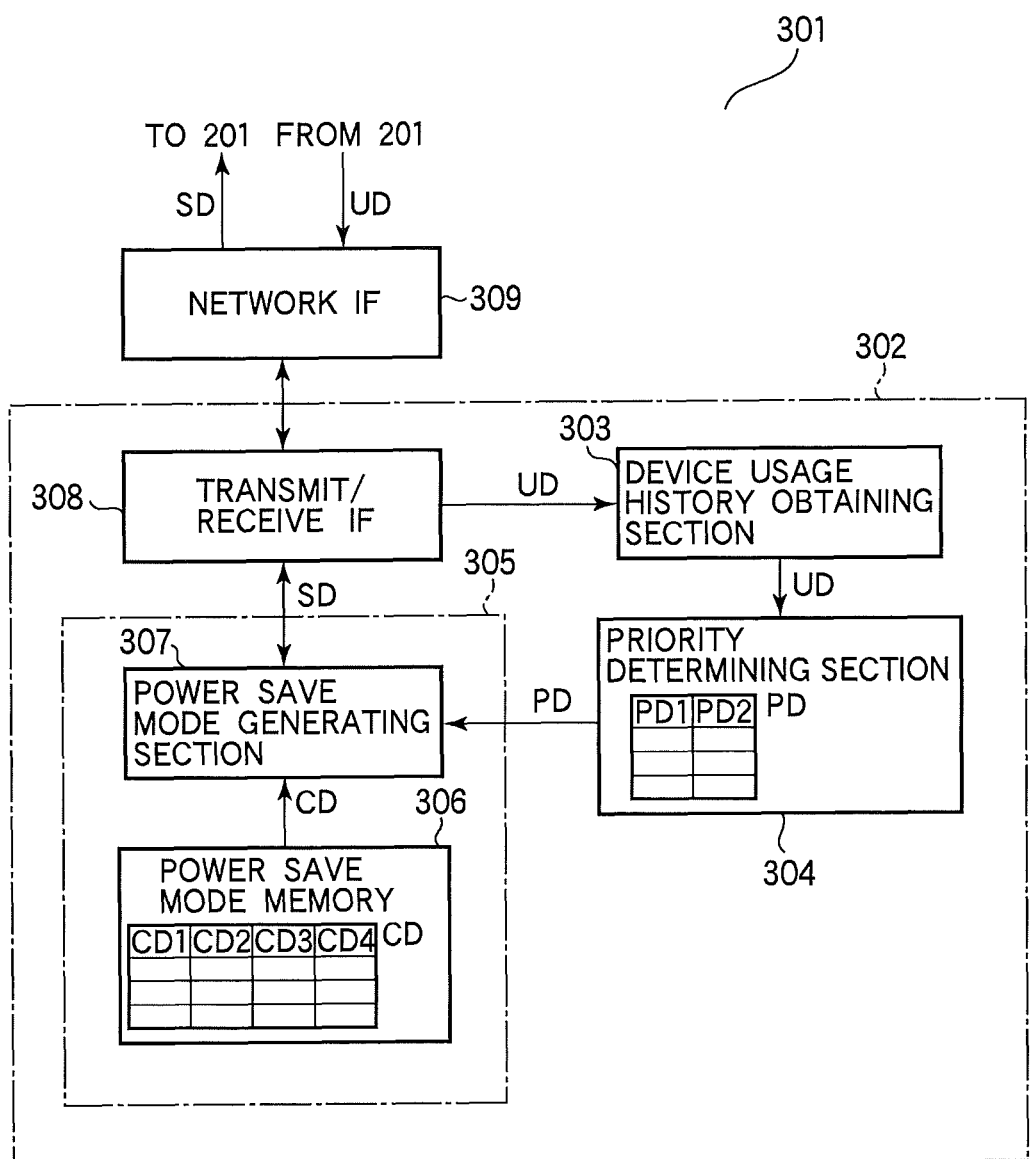
FIG. 18B illustrates the major portion of the management server.

FIG. 18A is a block diagram illustrating the general configuration of the management server 301. FIG. 18B illustrates the major portion of the management server 301 showing the flow of signals and data. The management server 301 will be described with reference to FIGS. 18A and 18B.

The management server 301 includes a management tool section 302 and the network IF 309.

The management tool section 302 includes a device usage history obtaining section 303, a priority determining section 304, a power save mode selecting section 305. The device usage history obtaining section 303 obtains the device usage history UD from the image processing apparatus 201 via the network IF 309 and a transmit/receive IF 308. The device usage history obtaining section 303 sends the device usage history UD to the priority determining section 304.

The priority determining section 304 determines the priority level for the devices in the image processing apparatus 201. The priority determining section 304 also generates a priority information table PD based on the device usage history UD. The larger the number of uses of a device is, the higher the priority level of the device is. The priority information table PD is the same as that of the first embodiment, and looks like that shown in FIG. 7.

Upon generation of the priority information table PD, the priority determining section 304 sends the priority information table PD to the power save mode selecting section 305.

The power save mode selecting section 305 selects an optimum power save mode for each device depending on the frequency of use of the device. The power save mode selecting section 305 includes a power save mode memory 306 and a power save mode generating section 307. The power save mode memory 306 stores the power save mode table CD indicative of the power save mode corresponding to the respective priority levels. The power save mode table CD looks like that shown in FIG. 8.

The power save mode generating section 307 generates the power save mode table SD based on the priority information table PD and power save mode table CD. The power save mode table SD looks like that shown in FIG. 9.

The power save mode generating section 307 generates the power save mode table SD, and sends the power save mode table SD to the image processing apparatus 201 via the transmit/receive IF 308 and the network IF 309.

The transmit/receive IF 308 receives a communication request from the management server 301, and sends a communication request to the network via the network IF 309. The transmit/receive IF 308 receives a communication request from the network via the network IF 309, and sends out a communication request via the network IF 309. The network IF 309 is an interface for communicating information between the network and the management server 301. The transmit/receive IF 308 and the network IF 309 function both as a receiving section that receives the information via the network and as a transmitting section that transmits the information via the network.

{Power-Up of Apparatus}

Figure 19:
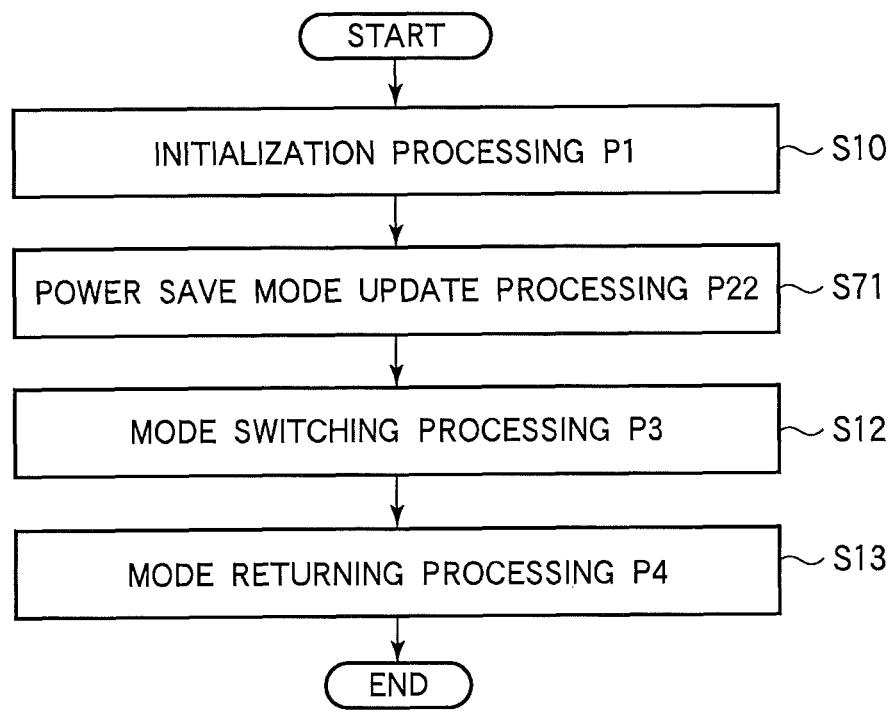
FIG. 19 is a flowchart illustrating processing for turning on the image processing apparatus.

FIG. 19 is a flowchart illustrating processing for turning on the image processing apparatus 201. The steps similar to those shown in FIG. 11 have been given the same step numbers. Upon completion of the initialization processing P1, the image processing apparatus 201 performs power save mode update processing P22 in which the power save mode of the respective devices is updated (S71). The image processing apparatus 201 then performs mode switching processing P3 in which idle devices are placed in their corresponding power save levels in accordance with the power save mode of the respective devices (S12). Subsequently, the image processing apparatus 201 performs mode returning processing P4 in which devices in the power save status or in the deep sleep status are returned to the normal status in response to the user's command (S13).

The steps S71, S12, and S13 may be executed simultaneously or in a different order from that shown in FIG. 19. The steps S71, S12, and S13 are executed repeatedly while the image processing apparatus 101 remains turned on.

{Power Save Mode Update Processing P22}

FIG. 20 is a flowchart illustrating the power save mode update processing P22. The steps similar to those shown in FIG. 13 have been given the same step numbers.

The power save mode update processing P22 will be described with reference to FIGS. 20 and 18B.

A detection processing section 103 detects when the user inputs a command to execute a function (e.g., COPYING) through the human interface unit 130 or a PC (not shown) (S30).

If the command detected by the detection processing section 103 is a command to execute a predetermined function, a function log producing section 104 generates a function log OD (S31).

The function log producing section 104 sends the function log OD generated at S31 to the obtaining section 210, and the execution log updating section 112 of the obtaining section 210 obtains the function log OD (S32).

The execution log updating section 112 updates the execution log ED held in the execution log memory 111 with the function log OD obtained at S32 (S33).

The execution log updating section 112 stores the updated execution log ED into the external storage section 127 which, in turn, holds the information as the stored execution log KED (S34).

The device usage history handling section 215 then updates the device usage history UD held in the device usage history memory 114, with the updated execution log ED updated at S33 and the function/device table TD held in the function/device table memory 113 (S35). The device usage history handling section 215 may be configured to execute S35 every time the updated execution log ED is updated at S33. Alternatively, the device usage history handling section 215 may execute S35 after the updated execution log ED is updated a predetermined number of times. Still alternatively, the device usage history handling section 215 may execute S35 after elapse of a predetermined time.

The device usage history handling section 215 sends the updated device usage history UD to the management server 301 via the transmit/receive IF 132 and the network IF 133 (S86).

The device usage history obtaining section 303 of the management server 301 obtains the updated device usage history UD from the image processing apparatus 201 via the network IF 309 and a transmit/receive IF 308 (S87). The device usage history obtaining section 303 sends the updated device usage history UD to the priority determining section 304.

The priority determining section 304 generates the priority information table PD based on the updated device usage history UD obtained at S87 (S88). For example, the priority determining section 304 obtains the number of uses of the respective device from the obtained updated device usage history UD, and generates the priority information table PD (FIG. 7) based on the updated device usage history UD. The larger the number of uses of a device is, the higher the priority level of the device is.

The priority determining section 304 sends the priority information table PD generated at S38 to the power save mode selecting section 305. The power save mode generating section 307 of the power save mode selecting section 305 obtains the priority information table PD (S89).

The power save mode generating section 307 generates the power save mode table SD based on the priority information table PD obtained S89 and the power save mode table CD held in the power save mode memory 306 (S90). For example, the power save mode generating section 307 obtains the combination of the priority and device name for each record in the priority information table PD. The power save mode generating section 307 then selects from the power save mode table CD a power save mode corresponding to the obtained priority. The power save mode generating section 307 combines the obtained device name and the selected power save mode, thereby generating the power save mode table SD (FIG. 9).

The power save mode generating section 307 transmits the power save mode table SD generated at S90 to the image processing apparatus 201 via the network IF 309 and a transmit/receive IF 308 (S91).

The power save mode table SD from the management server 301 is sent to the controller 220 via the transmit/receive IF 132 and network IF 133, and the power save mode setting section 221 of the controller 220 obtains the power save mode table SD (S92).

The power save mode setting section 221 updates the power save mode table SD held in the power save mode memory 122 with the power save mode table SD obtained at S92 (S42).

The power save mode setting section 221 also sends the power save mode table SD obtained at S92 to the external storage section 127 which, in turn, stores the received power save mode table SD as the stored power save mode KSD (S43).

As described above, the second embodiment offers the following advantages. Based on the history of usage of the respective devices of the image processing apparatus 201, the management server 301 automatically selects an optimum power save mode. This eliminates waste of electric power and improves ease of overall operation of the image processing apparatus 201 under management of the management server 301.

The first and second embodiments have been described in terms of the image processing apparatus 101 and 201, each being a multi function peripheral that includes the printer 106, scanner 107, communicator 108, and facsimile 109. However, the electronic apparatus according to the invention is not limited to such a multifunction peripheral, and may be of any type of apparatus including a printer apparatus, a facsimile machine, and a copying machine, provided that the electronic apparatus is configured to operate in a power save mode. The network 400 may be a cabled LAN or a wireless LAN. Alternatively, the management server 301 may be directly connected to the image processing apparatus 201 by means of, for example, USB instead of the network 400.

The first and second embodiments obtain the device usage history UD using the execution log ED. However, any information may be used as long as the device usage history UD can be obtained.

In the first and second embodiments, if the power save key 130g shown in FIG. 10 is depressed, the mode returning section 126 places a device, which has been assigned "HIGH" for the warm-up condition of the power save mode table SD (FIG. 9), in the normal status. However, the mode returning section 126 may not be limited to this. Instead, if the power save key 130g shown in FIG. 10 is depressed, the mode returning section 126 places a device, which has been assigned "HIGH" for the warm-up condition of the power save mode table SD (FIG. 9), in the normal status, and the mode switching section 125 places a device, which has been assigned "LOW" for the warm-up condition of the power save mode table SD (FIG. 9), in the power save status. If a device which has been assigned "LOW" for the warm-up condition of the power save mode table SD (FIG. 9) is in the power save status or in the deep sleep status, the switching section 125 maintains the device in the power save status or in the deep sleep status.

In the first and second embodiments, the device usage history handling sections 115 and 215 update the device usage history UD held in the device usage history memory 114 based on the execution log ED and the function/device table TD. Alternatively, the device usage history handling sections 115 and 215 may be configured to generate the device usage history UD based on the execution log ED and the function/device table TD at a predetermined timing. Such a timing may be, for example, when the execution log ED is updated, when execution log ED has been updated a predetermined number of times, or when a predetermined time has elapsed. When a new device usage history UD is generated, the device usage history handling sections 115 and 215 delete the old device usage history UD held in the device usage history memory 114 and then store the new device usage history UD.

The second embodiment is configured such that when the device usage history handling sections 215 updates the device usage history UD, the device usage history handling section 215 sends the device usage history UD to the management server 301. Alternatively, in response to the transmission request from the management server 301, the device usage history handling sections 215 may transmit the device usage history UD to the management server 301, in which case, the management server 301 may send a transmission request after elapse of a predetermined time. Still alternatively, the second embodiment may be configured such that the device usage history handling sections 215 notifies the management server 301 of the update of the device usage history UD, and then the management server 301 outputs a transmission request in response to the notification (e.g., after a predetermined number of notifications).

The invention being thus described, it will be obvious that the same may be varied in many ways. Such variations are not to be regarded as a departure from the scope of the invention, and all such modifications as would be obvious to one skilled in the art intended to be included within the scope of the following claims.

What is claimed is:

1. An electronic apparatus, comprising:
    a plurality of devices;
    an obtaining section configured to obtain, for each of the plurality of devices, a cumulative number of executions since a predetermined reference time;
    a priority determining section configured to determine, for each of the plurality of the devices, a priority level based on the cumulative numbers of the plurality of the devices;
    a power save mode selecting section holding a plurality of power save modes, and being configured to select one of the plurality of power save modes in accordance with the priority level of each of the plurality of devices; and
    a controller configured to control each device of the plurality of devices based on the power save mode selected for said each device; wherein
    each power save mode of the plurality of power save modes includes a power save condition corresponding to the priority level of the device having said each power save mode, a satisfaction of the power save condition causing the device having said each power save mode to shift to a power save status, the power save condition indicating a time period for the device having said each power save mode to be idle in a normal operation status before being shifted to the power save status; and
    of the plurality of power save modes, the longer is the time period indicated by the power save condition of a power save mode, the higher is the priority level of the device having the power save mode.

2. The electronic apparatus according to claim 1, wherein the obtaining section including:
    an execution log memory configured to hold an execution log representative of a cumulative number of executions of a function;
    an execution log updating section configured to update the execution log by adding a number of executions to the cumulative number of executions;
    a function/device table memory configured to hold a function/device table listing the plurality of devices having corresponding functions including the function;
    a device usage history handling section configured to generate a device usage history representative of the number of uses of each of the plurality of devices by calculating the number of uses of said each device based on the execution log and the function/device table;
    wherein the priority determining section determines the priority level of each of the plurality of devices based on the number of uses of said each device.

3. The electronic apparatus according to claim 2 further comprising a non-volatile memory, wherein the execution log updating section stores the execution log into the non-volatile memory.

4. The electronic apparatus according to claim 2, wherein the priority determining section determines the priority level of the devices such that the devices having higher frequencies of use are given higher priority levels, and then generates a list of priority levels of devices.

5. The electronic apparatus according to claim 4, wherein a power save mode selecting section includes:
    a power save mode memory configured to hold a priority/power save mode table that lists power save modes corresponding to the priority level of the devices; and
    a power save mode generating section configured to generate a power save mode table that lists power save modes for the devices, the power save mode table being generated based on the list of priority levels of devices and the priority/power save mode table.

6. The electronic apparatus according to claim 5, wherein the controller obtains the power save mode table from the power save mode selecting section, and controls one of the plurality of devices based on the power save mode table.

7. The electronic apparatus according to claim 6, wherein the power save mode table contains a warm-up condition to determine whether the device should enter the normal operation status;
    wherein if it is determined that the device should enter the normal operation status, the controller causes the device to enter the normal status upon reception of a command.

8. The electronic apparatus according to claim 6, wherein the power save mode table contains a power save level which the device should enter;
    wherein the controller causes the device to enter the power save level upon power-up of the electronic apparatus.

9. The electronic apparatus according to claim 6 further comprising a non-volatile memory, wherein the controller stores the power save mode table into the non-volatile memory.

10. The electronic apparatus according to claim 6, wherein the power save mode table contains the power save condition of the device;
    wherein if the device meets the power save condition, the controller causes the device to enter the power save status.

11. An electronic apparatus linked to a management server via a network, comprising:
- a plurality of devices;
- a detecting section configured to detect execution of a function of the plurality of devices and identify a number of executions of the function;
- an obtaining section configured to obtain, for each device of the plurality of devices, a cumulative number of executions since a predetermined reference time;
- a transmitter configured to transmit the cumulative number of executions of said each device to the management server;
- a receiver configured to receive a power save mode for said each device from the management server, the power save mode being determined by the management server based on the cumulative number of executions of said each device; and
- a controller configured to control each device of the plurality of devices based on the power save mode for said each device; wherein
- the power save mode includes a power save condition corresponding to a priority level of said each device, a satisfaction of the power save condition causing said each device to shift to a power save status, the power save condition indicating a time period for said each device to be idle in a normal operation status before being shifted to a power save status; and
- of all power save modes of the plurality of devices, the longer is the time period indicated by the power save condition of a power save mode, the higher is the priority level of the corresponding device.

12. The electronic apparatus according to claim 11, wherein the server comprises:
- a receiver configured to receive a device usage history for said each device from the electronic apparatus;
- a priority determining section configured to determine a priority level of each of the plurality of devices such that one of the plurality of devices having higher frequencies of use are given higher priority levels, and to then generate a list of priority levels of the plurality of devices;
- a power save mode memory configured to hold a priority/power save mode table that lists power save modes corresponding to the priority level of each of the plurality of devices;
- a power save mode generating section configured to generate a power save mode table that lists power save modes for the plurality of devices; and
- a transmitter configured to transmit the power save mode table for the plurality of devices.

13. The electronic apparatus according to claim 12, wherein the controller obtains the power save mode table from the management server, and controls the plurality of devices based on the power save mode table.

14. The electronic apparatus according to claim 13 further comprising a non-volatile memory, wherein the controller stores the power save mode table into the non-volatile memory.

15. The electronic apparatus according to claim 13, wherein the power save mode table contains a power save level which one of the plurality of devices should enter;
- wherein the controller causes said one device to enter the power save level upon power-up of the electronic apparatus.

16. The electronic apparatus according to claim 11, wherein the obtaining section including:
- an execution log memory configured to hold an execution log representative of a cumulative number of executions of the function;
- an execution log updating section configured to update the execution log by adding the number of executions to the cumulative number of executions;
- a function/device table memory configured to hold a function/device table listing the plurality of devices having corresponding functions;
- a device usage history handling section configured to generate a device usage history representative of the number of uses of the device by calculating the number of uses of the device based on the execution log and the function/device table.

17. The electronic apparatus according to claim 16 further comprising a non-volatile memory, wherein the execution log updating section stores the execution log into the non-volatile memory.

18. An electronic system in which an electronic apparatus and a management server are linked through a network, wherein the electronic apparatus includes:
- a plurality of devices;
- a detecting section configured to detect execution of a function of one of the plurality of devices and identify a number of executions of the function;
- an obtaining section configured to generate, for each device of the plurality of devices, a cumulative number of executions of said each device based on the number of executions of the function, and holding the cumulative number of executions;
- a transmitter configured to transmit the cumulative number of executions of said each device to the management server;
- a receiver configured to receive a power save mode for said each device from the management server; and
- a controller configured to control each device of the plurality of devices based on the power save mode for said each device;

wherein the management server includes:
- a receiver configured to receive the cumulative number of executions from the electronic apparatus;
- a priority determining section configured to determine a priority level of each of the plurality of devices such that one of the plurality of devices having higher frequencies of use are given higher priority levels, and to then generate a list of priority levels of the plurality of devices; and
- a transmitter holding a plurality of power save modes and configured to select one of the plurality of power save modes in accordance with the priority level of one of the plurality of devices; wherein
- each power save mode of the plurality of power save modes includes a power save condition corresponding to the priority level of the device having said each power save mode, a satisfaction of the power save condition causing the device having said each power save mode to shift to a power save status, the power save condition indicating a time period for the device having said each power save mode to be idle in a normal operation status before being shifted to the power save status; and
- of the plurality of power save modes, the longer is the time period indicated by the power save condition of a power save mode, the higher is the priority level of the device having the power save mode.

19. The electronic apparatus according to claim 2, wherein the execution log includes information on a function that the electronic apparatus is commanded to execute and information about a cumulative number of executions of the commanded function since a user inputs a command to obtain the execution log.

20. The electronic apparatus according to claim 1, wherein upon reception of a command, the controller causes one of the plurality of devices having a priority level higher than a predetermined priority level to enter the normal operation status, and causes the others of the plurality of devices to remain in the power save status or in a deep sleep status.

21. The electronic apparatus according to claim 1, wherein upon reception of a command, the controller causes one of the plurality of devices having a priority level higher than a predetermined priority level to enter the normal operation status, and causes another of the plurality of devices having a priority level equal to or lower than the predetermined priority level to enter the power save status.

22. The electronic apparatus according to claim 1, wherein upon power-up of the electronic apparatus, the controller cause one of the plurality of devices having a priority level equal to or lower than a predetermined priority level to enter a power save status or a deep sleep status.

* * * * *